(12) United States Patent
Ankolikar (10) Patent No.: US 9,676,340 B2
(45) Date of Patent: Jun. 13, 2017

(54) STORAGE DEVICE ARRANGED TO BE OPENED IN TWO DIFFERENT DIRECTIONS

(75) Inventor: Swamiray Ankolikar, Maharashtra (IN)

(73) Assignee: Faurecia Interior Systems India PVT. Ltd., Maharashtra (IN)

( * ) Notice: Subject to any disclaimer, the term of this patent is extended or adjusted under 35 U.S.C. 154(b) by 0 days.

(21) Appl. No.: 14/409,470

(22) PCT Filed: Jun. 20, 2012

(86) PCT No.: PCT/IN2012/000438
§ 371 (c)(1),
(2), (4) Date: Dec. 19, 2014

(87) PCT Pub. No.: WO2013/190561
PCT Pub. Date: Dec. 27, 2013

(65) Prior Publication Data
US 2015/0145271 A1 May 28, 2015

(51) Int. Cl.
*B60R 7/04* (2006.01)
*E05D 15/50* (2006.01)

(52) U.S. Cl.
CPC .............. *B60R 7/04* (2013.01); *E05D 15/502* (2013.01); *E05D 15/505* (2013.01);
(Continued)

(58) Field of Classification Search
CPC ..... B60R 7/04; B60R 7/06; B60R 2011/0007; B60N 2/4686; E05D 15/502;
(Continued)

(56) References Cited

U.S. PATENT DOCUMENTS 5,067,625 A * 11/1991 Numata ................. A45C 11/24
220/230
5,210,906 A * 5/1993 Aihara ...................... B60R 7/04
16/232

(Continued)

FOREIGN PATENT DOCUMENTS

EP        13044392 A2    4/2003
JP        1-161962 U     11/1989
(Continued)

OTHER PUBLICATIONS

International Search Report for application No. PCT/IN2012/000438, dated Apr. 4, 2013, 4 pages.
(Continued)

*Primary Examiner* — Gregory Blankenship
(74) *Attorney, Agent, or Firm* — Reising Ethington P.C.

(57) ABSTRACT

The storage device (1) comprises a storage compartment (2), comprising an upper opening (10), and a lid (6), said lid (6) being movable between a closed position and a first opened position, wherein the storage compartment (2) is accessible from a first side (12) of the opening (10), and a second opened position, wherein the storage compartment (2) is accessible from a second side (14) of the opening (10). The storage compartment (2) comprises a locking device comprising a first locking element (16) and a second locking element (18), respectively extending on the first side (12) and the second side (14) of the opening (10), each locking element (16, 18) being engaged in the lid (6) in the closed position in order to lock said lid (6), the storage compartment (2) further comprising an unlocking device selectively actuable to retract the first locking element (16) from the lid (6), while maintaining the second locking element (18) engaged in the lid (6), to move the lid (6) towards its first opened position, and to retract the second locking element (18) from the lid (6), while maintaining the first locking
(Continued)

element (16) engaged in the lid (6), to move the lid (6) towards its second opened position.

10 Claims, 5 Drawing Sheets

(52) U.S. Cl.
CPC ....... *E05Y 2201/11* (2013.01); *E05Y 2201/42* (2013.01); *E05Y 2201/422* (2013.01); *E05Y 2900/538* (2013.01); *E05Y 2900/602* (2013.01)

(58) Field of Classification Search
CPC ... E05D 15/505; E05D 15/50; E05Y 2201/11; E05Y 2201/42; E05Y 2201/422; E05Y 2900/538; E05Y 2900/602
USPC .................................. 296/24.34, 37.8, 1.09
See application file for complete search history.

(56) References Cited

U.S. PATENT DOCUMENTS

| | | | | |
|---|---|---|---|---|
| 5,357,652 A * | 10/1994 | Yamada | ................... | B60R 7/04 16/232 |
| 5,647,652 A * | 7/1997 | Zalewski | ................. | B60R 7/04 108/44 |
| 5,931,336 A * | 8/1999 | Takeuchi | ................. | B60R 7/04 220/836 |
| 6,142,333 A * | 11/2000 | Sasamoto | ................ | B60R 7/04 220/263 |
| 6,250,729 B1 * | 6/2001 | Allison | .................... | B60R 7/04 16/323 |
| 6,761,278 B2 * | 7/2004 | Hyp | ..................... | B60N 2/4686 220/254.2 |
| 7,984,942 B2 * | 7/2011 | Schaupensteiner | ..... | E05B 83/30 292/33 |
| 2003/0209956 A1 * | 11/2003 | Bae | ....................... | B60N 2/4686 312/324 |
| 2005/0282599 A1 * | 12/2005 | Hehn | ........................ | B60R 7/04 455/575.8 |
| 2009/0200825 A1 * | 8/2009 | Shimajiri | ............. | B60N 2/4686 296/37.8 |
| 2013/0270286 A1 * | 10/2013 | Fukui | ....................... | B60R 7/04 220/811 |
| 2014/0291372 A1 * | 10/2014 | Smith | ....................... | B60R 7/04 224/539 |
| 2015/0145271 A1 * | 5/2015 | Ankolikar | ............. | E05D 15/502 296/37.8 |

FOREIGN PATENT DOCUMENTS

| | | | | |
|---|---|---|---|---|
| JP | 2-30741 U | | 2/1990 | |
| JP | 3-47977 U | | 5/1991 | |
| JP | 2007-145165 | * | 6/2007 | ............... B60R 7/04 |
| JP | 2009-126183 | * | 6/2009 | ............... B60R 7/04 |
| JP | 2009-132326 | * | 6/2009 | ............... B60R 7/04 |
| JP | 2010-133138 A | | 6/2010 | |
| JP | 2011-088620 | * | 5/2011 | ............... B60R 7/04 |
| JP | 2012-184002 | * | 9/2012 | ............... B60R 7/04 |

OTHER PUBLICATIONS

Written Opinion or application No. PCT/IN2012/000438, dated Apr. 4, 2013, 6 pages.

* cited by examiner

STORAGE DEVICE ARRANGED TO BE OPENED IN TWO DIFFERENT DIRECTIONS

TECHNICAL FIELD

The present invention relates to a storage device of the type comprising a storage compartment, comprising an upper opening, and a lid, said lid being movable between a closed position, wherein the lid covers the upper opening, and a first opened position, wherein the storage compartment is accessible from a first side of the opening, and a second opened position, wherein the storage compartment is accessible from a second side of the opening, opposite said first side of the opening.

BACKGROUND

Such storage devices, which can be opened from one side or the other, are known, for example to form central armrests extending between two neighbouring seats in a vehicle. With such a storage device, it is possible for both occupants of the seats to access the storage compartment easily simply by opening the storage device from the appropriate side of the opening.

Such a storage device needs a locking device able to lock the lid in its closed position and to allow the lid to move to its first or second opened positions depending on the side from which it is desired to access to the storage compartment. Such a storage device also needs an unlocking device able to cooperate with the locking device to open and close the lid. Such an unlocking device must be easily actuable from both side of the storage compartment such that both users of the storage device can easily open the lid, no matter on which side of the storage device they are seated.

Known locking and unlocking devices are usually very complex and require many movable parts arranged both on the storage compartment and on the lid. The complexity and the number of movable parts of such locking and unlocking devices make them fragile and subject to malfunctions. Furthermore, such locking and unlocking devices are very cumbersome, especially on the lid, which results in a loss of space leading to a reduction of the storage volume of the storage compartment and in a gain of weight on the lid, which becomes less easy to manipulate and which requires more robust parts to ensure its opening and its maintaining m its opened positions. The storage device is therefore expensive to produce.

SUMMARY

One of the aims of the invention is to propose a storage device comprising simple looking and unlocking devices, with a reduced number of movable parts, the storage device being therefore more robust and less cumbersome.

To this end, the invention relates to a storage device according to the above-mentioned type, wherein the storage compartment comprises a locking device comprising a first locking element and a second locking element, respectively extending on the first side and the second side of the opening, each locking element being engaged in the lid in the closed position in order to lock said lid in said closed position, the storage compartment further comprising an unlocking device selectively actuable to retract the first locking element from the lid, while maintaining the second locking element engaged in the lid, to move the lid towards its first opened position, and to retract the second locking element from the lid, white maintaining the first locking element engaged in the lid, to move the lid towards its second opened position.

In the storage device according to the invention, there is no movable part provided on the lid, which can therefore be simplified and have a reduced weight. Furthermore, the absence of cooperation between movable parts on the lid and on the storage compartment makes the storage device more robust and less susceptible of malfunctioning. In addition, since the lid is simplified, there is more freedom in the design of the lid to enhance the aesthetic appearance of the storage device. The locking and unlocking devices are less cumbersome, which makes it possible to increase the storage volume without increasing the overall volume of the storage device.

According to other features of the storage device according to the invention:

said storage compartment further comprises an opening device comprising at a first constraint element and a second constraint element, respectively arranged to push the lid towards its first opened position and its second opened position, the locking device preventing the opening of the lid in the closed position and allowing the first constraint element to push the lid towards its first opened position when the unlocking device has retracted the first locking element from the lid and allowing the second constraint element to push the lid towards its second opened position when the unlocking device has retracted the second locking element from the lid;

the first locking element and the second locking element extend respectively according to a first longitudinal axis and a second longitudinal axis, said first and second longitudinal axes being substantially parallel to the first and second sides of the opening, the lid being movable in rotation around the first longitudinal axis to move between the closed position and the second opened position and in rotation around the second longitudinal axis to move between the closed position and the first opened position;

the first and second constraint elements are formed by springs extending respectively around the second longitudinal axis and around the first longitudinal axis, said springs each comprising an end applied against the lid to push said lid towards the first or second opened positions when the unlocking device is actuated;

the unlocking device comprises a first lever and a second lever, connected respectively to the first locking element and to the second locking element, each lever being movable in translation according to a longitudinal direction between a locking position, wherein the first lever, respectively the second lever, maintains the first locking element, respectively the second looking element, in the lid and an unlocking position, wherein the first lever, respectively the second lever, acts on the first locking element, respectively the second locking element, to retract said locking element from the lid;

the unlocking device comprises a first actuation device and a second actuation device provided respectively on the first side of the opening and on the second side of the opening, the first and second actuation devices being respectively connected to the first lever and the second lever, said actuation devices being actuable to move the levers between their locking position and unlocking position;

the unlocking device comprises a first spring and a second spring, the first lever, respectively the second lever, moving towards its unlocking position against the force exerted by the first spring, respectively the second spring, and returning to its locking position under the force of the first spring, respectively the second spring, when the first lever, respectively the second lever, is released;

the first lever and the second lever each comprise a locking in arranged to lock said levers in their unlocking position, said locking pin penetrating in a corresponding aperture in the storage compartment when said lever is in its unlocking position, the lid ejecting said locking pin from its aperture when it comes in its closed position to release said lever, which returns to its locking position under the force of the corresponding spring;

the first lever and the second lever each comprise an interfering element, the interfering element of the first lever, respectively of the second lever, being arranged to prevent the second constraint element, respectively the first constraint element, from moving when said first lever, respectively second lever, in its unlocked position; and the storage device is a central armrest in a vehicle, said armrest being intended to be placed between to neighbouring seats in said vehicle.

BRIEF DESCRIPTION OF THE DRAWINGS

Other aspects and advantages of the invention will appear upon reading the following description, given by way of example and made in reference to the appended drawings, wherein.

DETAILED DESCRIPTION OF THE ILLUSTRATED EMBODIMENT(S)

Figure 1:
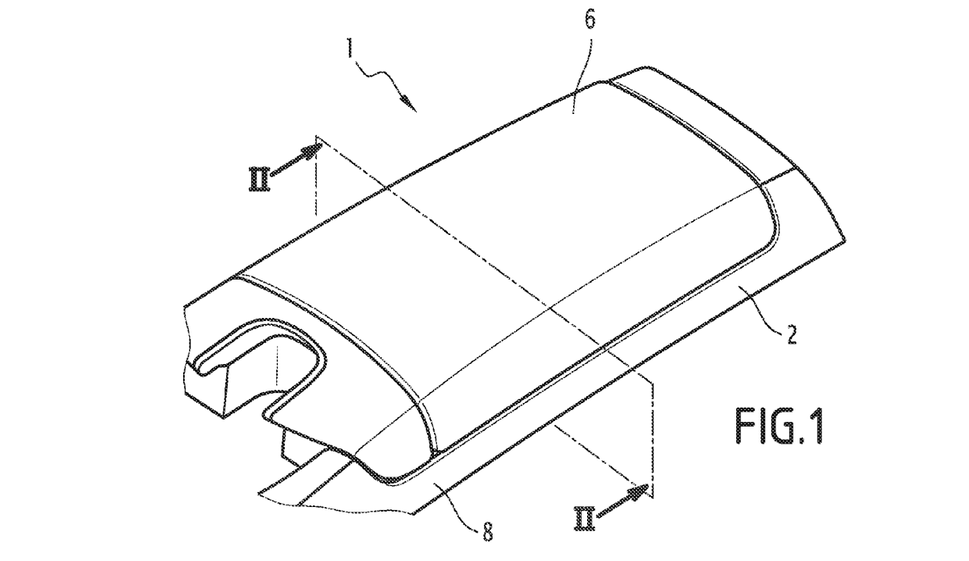
FIG. 1 is a perspective view of a part of e storage device in a closed position.

Referring to FIG. 1, there is disclosed a storage device 1, for example in the form of a central armrest of a vehicle intended to be installed between to neighbouring seats of the vehicle. The storage device comprises a storage compartment 2, defining a storage volume 4 therein, and a lid 6 closing the storage compartment 2 and forming for example a rest surface for the arms of the occupants of the seats surrounding the storage device 1. Although the storage device is described herein as a central armrest, it is to be understood that the storage device can be any kind of storage device.

The storage compartment 2 comprises for example our lateral walls 8 and a bottom (not shown) defining between them the storage volume 4 of substantially parallelepiped shape. More particularly, the storage compartment 2 comprises two opposite longitudinal wails 8, extending in a longitudinal direction, connected to each other by two transversal walls (not shown). When the storage device 1 is installed in a vehicle, the longitudinal direction substantially corresponds to the rear-front direction of the vehicle, and the transversal direction substantially corresponds to the width of the vehicle.

The storage compartment 2 further comprises, opposite the bottom, an upper opening 10, defined between the walls 8, and from which the storage volume 4 is accessible by the users. One of the longitudinal walls 8 defines a first side 12, or first edge, of the opening 10 and the other longitudinal wall 8 defines a second side 14, or second edge, of the opening 10.

In a closed position (FIG. 1 and 2), the lid 6 covers the upper opening 10 and closes the storage volume 4. In this position, the lid 8 is attached to the two longitudinal walls 8 in a releasable manner. The lid 6 is mounted on the first side 12 and on the second side 14 so as to be able to move in rotation around a first longitudinal axis A extending along the first side 12 of the opening, when the attachment between the lid 6 and the second side 14 is released, and around a second longitudinal axis B, extending along the second side 14 of the opening, when the attachment between the lid 6 and the first side is released. The lid 6 is therefore movable between the closed position and a first opened position (not shown), wherein the lid 6 has rotated around the second longitudinal axis B, as shown by arrow F' of FIG. 2, and the storage volume 4 is accessible from the first side 12, and a second opened position (shown in dotted-lines in FIG. 2), wherein the lid 6 has rotated around the first longitudinal axis A, as shown by arrow F of FIG. 2, and the storage volume 4 is accessible from the second side 14.

Figure 3:
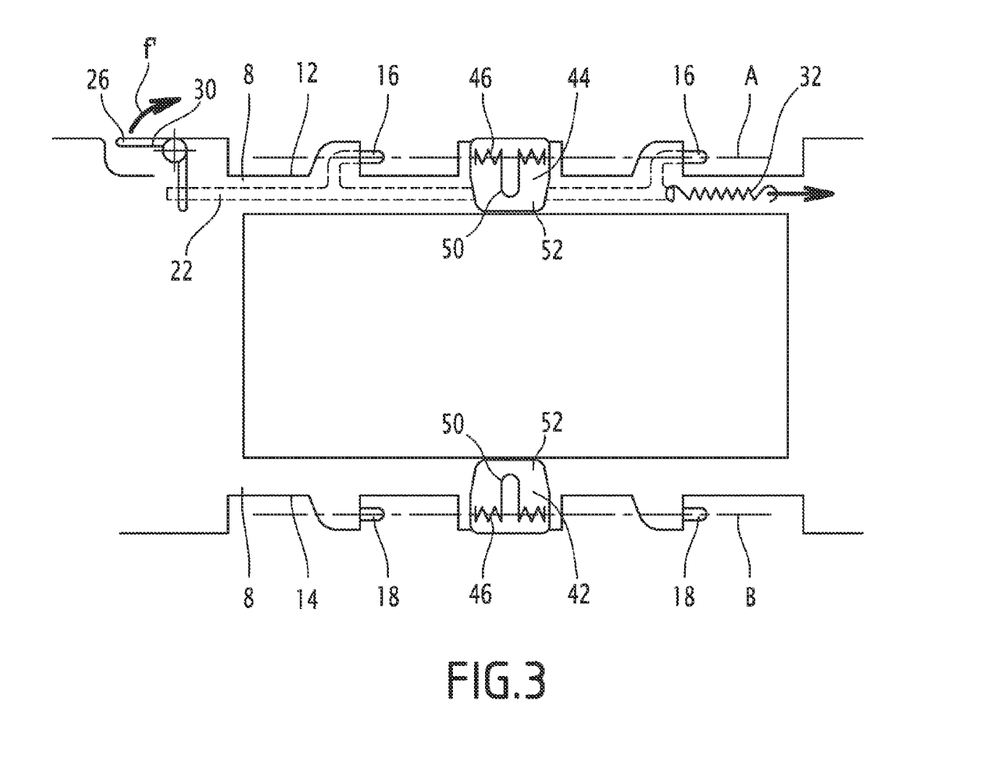
FIG. 3 is a top view of the storage device without the lid of the storage device.
Figure 4:
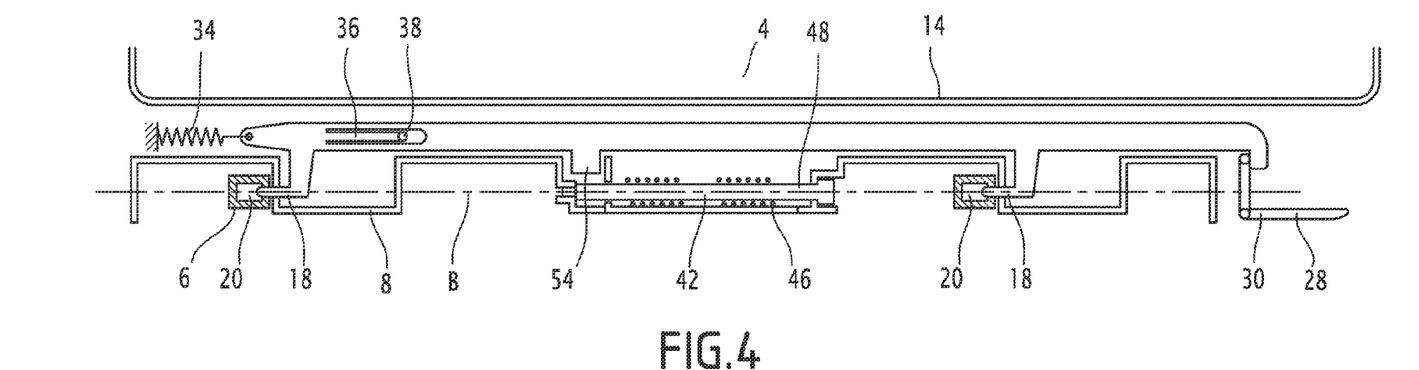
FIG. 4 is a top view of a part of the unlocking device of the storage device according to the invention, the lever being in a locking position.

The lid 6 is attached on both sides 12 and 14 of the opening 10 in a releasable manner via a locking device comprising a first locking element 16 attaching the lid 6 to the first side 12 of the opening 10 in a releasable manner and a second locking element 18 attaching the lid 6 to second side 14 of the opening 10 in a releasable manner, as shown in FIG. 3. Each locking element 16 and 18 is formed by one or more pins extending longitudinally along the first longitudinal axis A for the first locking element 16 and along the second longitudinal axis B for the second locking element 18. Each pin is arranged to be inserted or engaged in a corresponding housing 20 provided on each longitudinal edge of the lid 6, as shown in FIG. 4.

When all the pins of the first locking element 16 and of the second locking element 18 are engaged in their corresponding housings 20, the lid 6 is in its closed position and is locked on the first side 12 and on the second side 14. In this closed position, the lid 6 covers the upper opening 10 and can not be moved.

When only the pins of the first locking element 16 are engaged in their corresponding housings 20, the pins of the second locking element 18 extending outside of their corresponding housings 20, the lid 6 is able to move in rotation around the first longitudinal axis A, the lid 6 turning around the pins of the first locking element 16, such that the lid 6 can move between its closed position and its second opened position. Indeed, when the pins of the second locking element 18 are outside their corresponding housings 20, the lid 6 is no longer attached to the longitudinal wall 6 forming the second side 14 of the opening 10 and is only attached in rotation on the longitudinal wall 8 forming the first side 12 of the opening 10.

When only the pins of the second locking element 18 are engaged in their corresponding housings 20, the pins of the first locking element 16 extending outside of their corresponding housings 20, the lid 6 is able to move in rotation around the second longitudinal axis B, the lid 6 turning around the pins of the second locking element 18, such that the lid 6 can move between its closed position and its first opened position. Indeed, when the pins of the first locking element 16 are outside their corresponding housings 20, the lid 6 is no longer attached to the longitudinal wall 8 forming the first side 12 of the opening 10 and is only attached in rotation on the longitudinal wall 8 forming the second side 14 of the opening 10.

Figure 5:
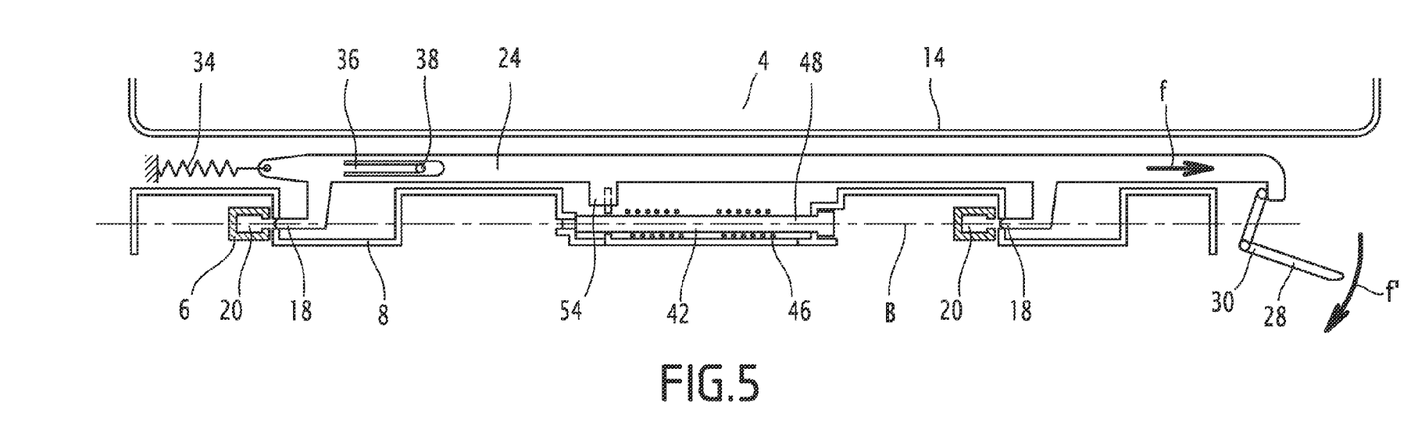
FIG. 5 is a top view of the part of the unlocking device of FIG. 4, the lever being in an unlocking position.

In order to retract the pins of the first locking element 16 or of the second locking element 18 from their corresponding housings 20, as shown on FIG. 5, the storage device 1 comprises an unlocking device selectively actuable to retract the first locking element 16 from the lid, while maintaining the second locking 18 element engaged in the lid and retract the second locking element from the lid, white maintaining the first locking element engaged in the lid. The unlocking device comprises a first lever 22 connected to the pins of the first locking element 16 and a second lever 24 connected to the pins of the second locking element 18. The first lever 22 extends for example in the longitudinal wall 8 forming the first side 12 of the opening 10 and the second lever 24 extends in the longitudinal wall 8 forming the second side 14 of the opening 10. According to the embodiments shown in the figures, the first lever 22 is made integral with the pins of the first looking element 16 and the second lever 24 is made integral with the pins of the second locking element 18. Each lever 22 and 24 extends substantially longitudinally and is movable in translation according to its longitudinal axis between a locking position (FIG. 4) and an unlocking position (FIG. 5), each locking element 16 and 18 moving with the lever 22 and 24 to which it is attached.

In the locking position, the first lever 22, respectively the second lever 24, engages and maintains the pins of the first locking element 16, respectively of the second locking element 18, in their corresponding housings in the lid 6. In the unlocking position, the first lever 22, respectively the second lever 24, retracts the pins of the first locking element 16, respectively the second locking element 18, from their corresponding housings 20 in the lid 6, such that the pins extend outside their respective housings 20.

When both levers 22 and 24 are in their locking position, the lid 6 is therefore locked in its closed position. When only the first lever 22 is in its locking position, the second lever being in its unlocking position, the lid 6 is able to move between its closed position and its second opened position. When only the second lever 24 is in its locking position, the first lever 22 being in its unlocking position, the lid 6 is able to move between its closed position and its first opened position.

To actuate the first and second levers 22 and 24 between their locking and unlocking positions, the unlocking device further comprises a first actuation device 26 and a second actuation device 28, connected respectively to the first lever 22 and to the second lever 24. The first actuation device 26 is provided on the longitudinal wall 8 forming the first side 12 of the opening 10 in order to be accessible to the user placed on the first side of the storage device and the second actuation device 28 is provided on the longitudinal wall 8 forming the second side 14 of the opening 10 in order to be accessible to the user placed on the second side of the storage device. Each actuation device 26 and 28 is for example formed by a knob 30 movable in rotation and connected to the corresponding lever 22 and 24 in such a way that the knob 30 pulls on the corresponding lever 22 and 24 to move it from its locking position to its unlocking position as shown by arrows f and f' of FIG. 5.

The first and second levers 22 and 24 are respectively attached to a first spring 32 and a second spring 34, these springs 32 and 34 also being attached to the storage compartment 2, such that the first and second levers 22 and 24 move towards their unlocking position against the force of the first and second springs 32 and 34, meaning that the first and second springs 32 and 34 tend to bring back the first and second levers 22 and 24 respectively towards their locking position when the levers 22 and 24 are moved in translation.

According to the embodiment shown in the figures, the knob 30 is attached at one end of the lever 22, 24 and pulls on the lever 22, 24 to bring it in its unlocking position and the spring 32, 34 is attached at the opposite end of the lever 22, 24 and pulls on the lever 22, 24 to bring it back in its locking position when the knob 30, and therefore the lever 22, 24, is released by the user, as shown in FIGS. 4 and 5.

Figure 8:
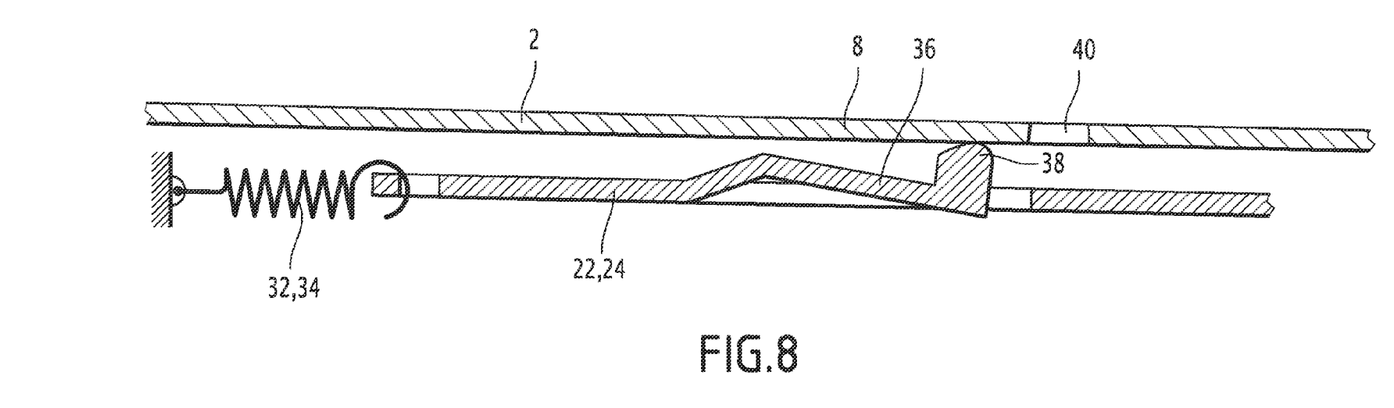
FIG. 8 is a top view of a part of the unlocking device of the storage device according to the invention, the lever being in a locking position.
Figure 9:
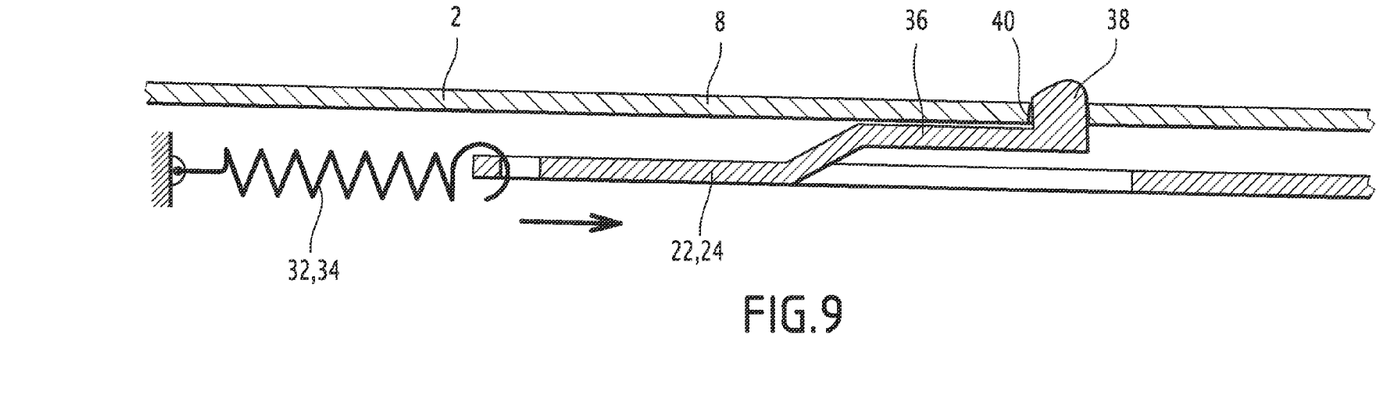
FIG. 9 is a top view of the part of the unlocking device of FIG. 8, the lever being in an unlocking position.

The first and second levers 22, 24 each further comprise a locking pin 36, formed by an elastic tab, arranged to lock the first and second levers 22, 24 in their unlocking position. More particularly, the locking pin 36 of the first lever 22 is arranged to lock the first lever 22 in its unlocking position when the lid 6 is in its second opened position and the locking pin 36 of the second lever 24 is arranged to lock the second lever 24 in its unlocking position when the lid is in its first opened position. To this end, the locking pin 36 is formed by a elastic tab comprising a projection 38 at its free end, this projection being arranged to penetrate in an aperture 40 provided in the storage compartment 2 when the lever comprising this locking pin 36 is in its unlocking position, as shown in FIG. 9. When the projection 38 is in the aperture 40, the lever is locked in its unlocking position against the force of the corresponding spring and the projection 38 protrudes behind the aperture 40 on the first or second side 12, 14 of the opening 10. When the lid 6 is closed, the lid 6 is arranged to push on the projection 38 to eject it from the aperture 40 and the lever is brought back to its locking position by the force of the corresponding spring, as shown in FIG. 8.

According to the embodiments shown in the figures, the locking pin 36 is made integral with the lever 22, 24. In another embodiment (not shown), the locking pin 32 is a separate part attached on the lever 22, 24.

With the locking and unlocking devices described above, the storage device can be used in a very simple manner to open it from one side or the other.

When the user seats towards the first side 12 of the opening 10 and therefore wants to access the storage volume 4 from the first side 12, the user simply actuates the first actuation device 26 to put the first lever 22 in its unlocking position, thereby retracting the pins of the first locking element 16 from their corresponding housings 20 in the lid 6. The lid 6 is then free to rotate around the second longitudinal axis B, since the second lever 24 is in its locking position, and to be placed in its first opened position, wherein the storage volume 4 can be accessed from the first side 12 of the opening 10. When the user closes the lid 6 from its first opened position, the lid 6 comes into contact with the first side 12 of the opening, thereby ejecting the projection 38 of the locking pin 36 of the first lever 22 from the aperture 40. The first lever 22 then returns to its locking position and engages the first locking element 16 in the lid 6, which is then locked in its closed position.

When the user seats towards the second side 14 of the opening 10 and therefore wants to access the storage volume 4 from the second side 14, the user simply actuates the second actuation device 28 to put the second lever 24 in its unlocking position, thereby retracting the pins of the second locking element 18 from their corresponding housings 20 in the lid 6. The lid 6 is been free to rotate around the first longitudinal axis A, since the first lever 22 is in its locking position, and to be placed in its second opened position, wherein the storage volume 4 can be accessed from the second side 14 of the opening 10. When the user closes the lid 6 from its second opened position, the lid 6 comes into contact with the second side 14 of the opening, thereby ejecting the projection 38 of the tacking pin 36 of the second lever 24 from the aperture 40. The second lever 24 then returns to its locking position and engages the second locking element 18 in the lid 6, which is then locked in its closed position.

To further simplify the use of the storage device of the invention, this storage device 1 further comprises an opening device arranged to automatically place the lid 6 in its first opened position, respectively its second opened position, when the first actuation device 26, respectively the second actuation device 28, is actuated.

Figure 2:
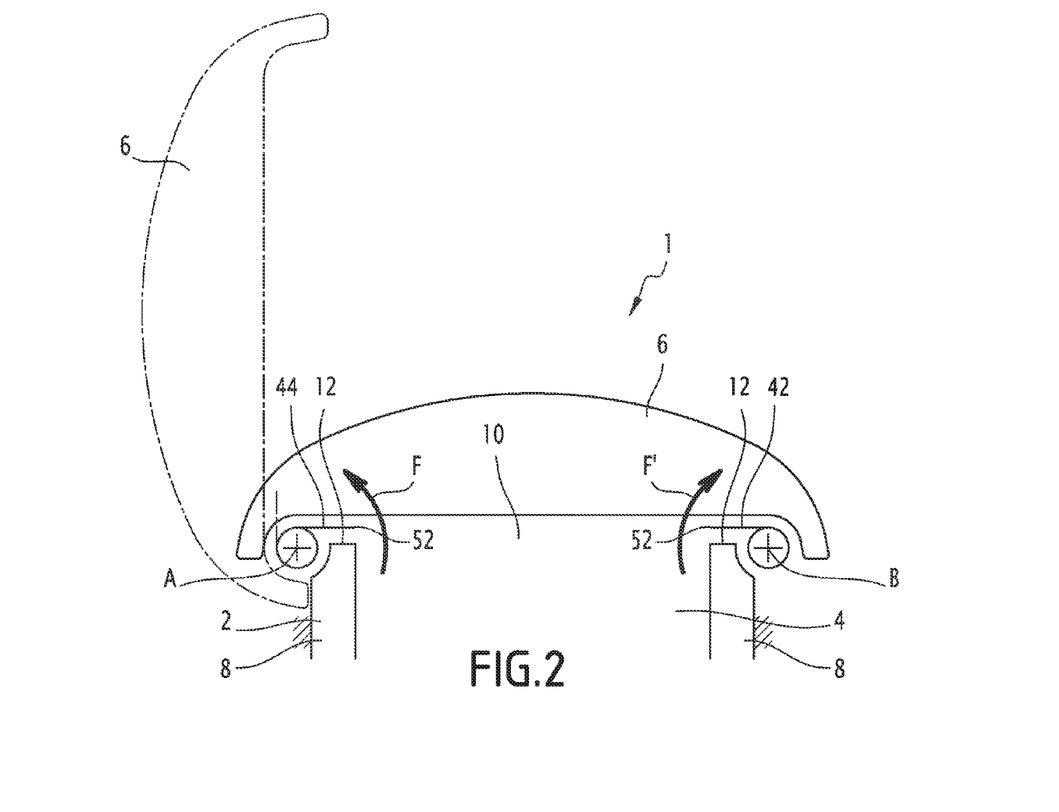
FIG. 2 is a section-view of the storage device in its closed position, according to line II-II of FIG. 1.
Figure 6:
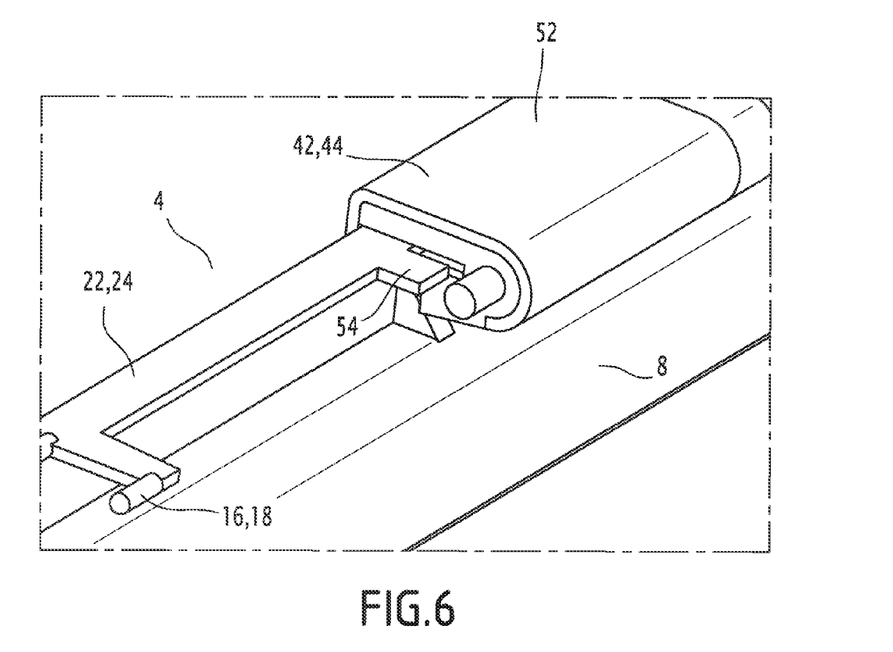
FIG. 6 is a perspective view of a part of the unlocking device and of the opening device of the storage device according to the invention, in a closed position.
Figure 7:
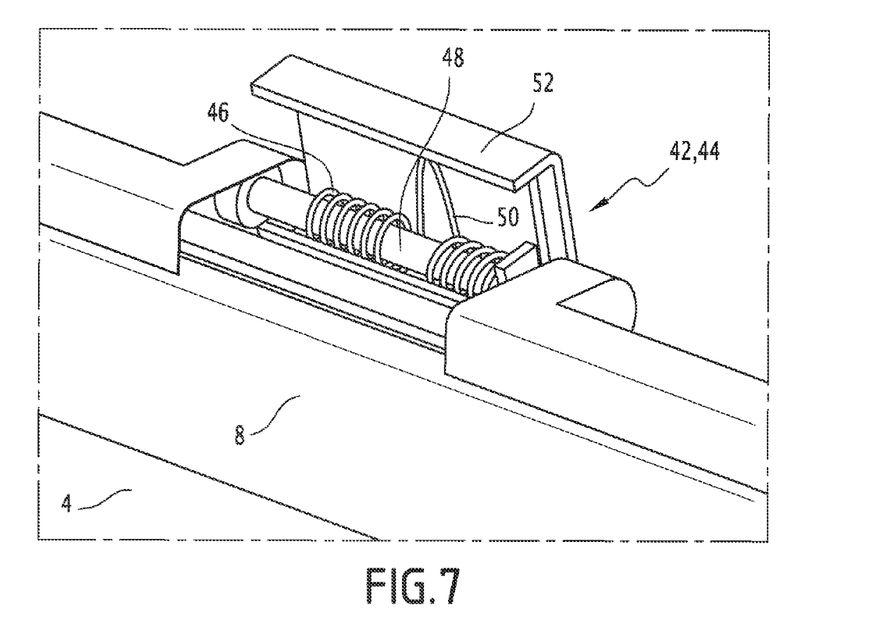
FIG. 7 is a perspective view of the part of the opening device of FIG. 6, the storage device being in a opened position.

The opening device comprises a first constraint element 42 and a second constraint element 44 respectively arranged to push the lid 6 towards its first opened position and its second opened position. The first constraint element 42, respectively the second constraint element 44, is formed by a spring 46 extending around the second longitudinal axis B, respectively the first longitudinal axis A. More particularly, the spring 46 extends around a shaft 48 mounted in rotation, around the first rotation axis A or the second rotation axis B, on the longitudinal well 8 forming the first side 12 or the second side 14 of the opening 10. A free end 50 of the spring 46 is applied against a tab 52, movable in rotation with the shaft 48 and facing the lid 6 in the closed position and protruding, meaning that the tab 52 forms a pad of the first side 12 or of the second side 14, as shown in FIG. 2 and 6. The spring 46 is loaded in such a way that it tends to push the tab 52 towards the lid 6 by rotating around the shaft 48. With such an arrangement, when the first actuation device 26 is actuated to piece the first lever 22 in its unlocking position, the first constraint element 42 rotates around the second rotation axis B and pushes against the lid 6, via its tab 52 as shown in FIGS. 2 and 7, to place the lid in its first opened position. When the second actuation device 28 is actuated to place the second lever 24 in its unlocking position, the second constraint element 44 rotates around the first rotation axis A and pushes against the lid 6, via its tab 52 as shown in FIGS. 2 and 7, to place the lid in its second opened position.

According to an embodiment, the first and second levers 22 and 24 each comprise an interfering element 54. The interfering element 54 of the first lever 22, respectively the second lever 24, is arranged to interfere with the second constraint element 44, respectively the first constraint element 42, when the first lever 22, respectively the second lever 24, is in its unlocking position in such a way as to prevent the rotation of the tab 52 of the second constraint element 44, respectively the first constraint element 42. In this manner, the first constraint element 42, respectively the second constraint element 44, does not move when the lid 6 is opened towards its second opened position, respectively towards its first opened position. The interfering element 54 is for example formed by a tab, integral with the first or second lever 22, 24, which is moved with the lever when it is placed in its unlocking position and which prevents the corresponding constraint element from moving, as shown in FIG. 5.

The storage device 1 described above is therefore very simple to use, simply by actuating the first or second actuation devices 26, 28 depending on the side from which the storage volume 4 is to be accessed to open the lid and by pressing against the lid 6 towards the opening 10 to close the lid. The locking and unlocking devices do not comprise any movable part provided in the lid 6, which can be simplified and presents a reduced weight. Furthermore, the storage device 1 is more robust since there is no complicated cooperation between the lid and the storage compartment.

The invention claimed is:

1. Storage device comprising a storage compartment, comprising an upper opening, and a lid, said lid being movable between a closed position, wherein the lid covers the upper opening, and a first opened position, wherein the storage compartment is accessible from a first side of the opening, and a second opened position, wherein the storage compartment is accessible from a second side of the opening, opposite said first side of the opening, wherein the storage compartment comprises a locking device comprising a first locking element and a second locking element, respectively extending on the first side and the second side of the opening, each locking element being engaged in the lid in the closed position in order to lock said lid in said closed position, the storage compartment further comprising an unlocking device selectively actuable to retract the first locking element from the lid, while maintaining the second locking element engaged in the lid, to move the lid towards its first opened position, and to retract the second locking element from the lid, while maintaining the first locking element engaged in the lid, to move the lid towards its second opened position;

wherein the unlocking device comprises a first lever and a second lever, connected respectively to the first locking element and to the second locking element, each lever being movable in translation according to a longitudinal direction between a locking position, wherein the first lever, respectively the second lever, maintains the first locking element, respectively the second locking element, in the lid and an unlocking position, wherein the first lever, respectively the second lever, acts on the first locking element, respectively the second locking element, to retract said locking element from the lid; and wherein the storage compartment comprises two opposite longitudinal walls extending in the longitudinal direction, one of the longitudinal walls defining the first side and the other of the longitudinal walls defining the second side.

2. Storage device according to claim 1, wherein said storage compartment further comprises an opening device comprising at a first constraint element and a second constraint element, respectively arranged to push the lid towards its first opened position and its second opened position, the locking device preventing the opening of the lid in the closed position and allowing the first constraint element to push the lid towards its first opened position when the unlocking device has retracted the first locking element from the lid and allowing the second constraint element to push the lid towards its second opened position when the unlocking device has retracted the second locking element from the lid.

3. Storage device according to claim 1, wherein the first locking element and the second locking element extend respectively according to a first longitudinal axis and a second longitudinal axis, said first and second longitudinal axes being substantially parallel to the first and second sides of the opening, the lid being movable in rotation around the first longitudinal axis to move between the closed position and the second opened position and in rotation around the second longitudinal axis to move between the closed position and the first opened position.

4. Storage device according to claim 2, wherein the first and second constraint elements are formed by springs extending respectively around the second longitudinal axis and around the first longitudinal axis, said springs each comprising an end applied against the lid to push said lid towards the first or second opened positions when the unlocking device is actuated.

5. Storage device according to claim 1, wherein the unlocking device comprises a first actuation device and a second actuation device provided respectively on the first side of the opening and on the second side of the opening, the first and second actuation devices being respectively connected to the first lever and the second lever, said actuation devices being actuable to move the levers between their locking position and unlocking position.

6. Storage device according to claim 1, wherein the unlocking device comprises a first spring and a second spring, the first lever, respectively the second lever, moving towards its unlocking position against the force exerted by the first spring, respectively the second spring, and returning to its locking position under the force of the first spring, respectively the second spring, when the first lever, respectively the second lever, is released.

7. Storage device according to claim 6, wherein the first lever and the second lever each comprise a locking pin arranged to lock said levers in their unlocking position, said locking pin penetrating in a corresponding aperture in the storage compartment when said lever is in its unlocking position, the lid ejecting said locking pin from its aperture when it comes in its closed position to release said lever, which returns to its locking position under the force of the corresponding spring.

8. Storage device according to claim 1, wherein said storage compartment further comprises an opening device comprising at a first constraint element and a second constraint element, respectively arranged to push the lid towards its first opened position and its second opened position, the locking device preventing the opening of the lid in the closed position and allowing the first constraint element to push the lid towards its first opened position when the unlocking device has retracted the first locking element from the lid and allowing the second constraint element to push the lid towards its second opened position when the unlocking device has retracted the second locking element from the lid; and wherein the first lever and the second lever each comprise an interfering element, the interfering element of the first lever, respectively of the second lever, being arranged to prevent the second constraint element, respectively the first constraint element, from moving when said first lever, respectively second lever, is in its unlocked position.

9. Storage device according to claim 1, wherein the storage device is a central armrest in a vehicle, said armrest being intended to be placed between to neighbouring seats in said vehicle.

10. Storage device according to claim 1, further comprising a transverse wall extending from one of the longitudinal walls to the other of the longitudinal walls, wherein the longitudinal walls are longer in the longitudinal direction than the transverse wall.

\* \* \* \* \*